United States Patent [19]
Stoll et al.

[11] Patent Number: 6,039,358
[45] Date of Patent: Mar. 21, 2000

[54] CONNECTING MEANS FOR TWO MEMBERS IN FLUID CONDUCTING ASSEMBLY

[75] Inventors: Kurt Stoll, Esslingen; Rolf Berger, Wolfschlugen; Günter Gebauer, Esslingen, all of Germany

[73] Assignee: Festo AG & Co., Esslingen, Germany

[21] Appl. No.: 09/022,107

[22] Filed: Feb. 11, 1998

[30] Foreign Application Priority Data

Feb. 26, 1997 [DD] German Dem. Rep. .......... 197 07 630

[51] Int. Cl.[7] ...................................................... F16L 19/02
[52] U.S. Cl. ........................... 285/23; 285/325; 285/364; 403/331
[58] Field of Search .................... 285/23, 124.5, 285/125.1, 325, 364, 420; 403/331, 338, 381

[56] References Cited

U.S. PATENT DOCUMENTS

| | | | |
|---|---|---|---|
| 2,512,177 | 6/1950 | Shaler | 403/381 |
| 4,070,045 | 1/1978 | Colter et al. | 285/325 |
| 4,289,335 | 9/1981 | Olberman . | |
| 4,533,020 | 8/1985 | Yamazaki . | |
| 5,080,400 | 1/1992 | Adamek et al. | 285/23 |
| 5,372,392 | 12/1994 | Dunn et al. | 285/364 X |
| 5,383,689 | 1/1995 | Wolfe, Sr. . | |
| 5,951,066 | 9/1999 | Lane et al. | 285/364 |

FOREIGN PATENT DOCUMENTS

| | | |
|---|---|---|
| 0 047 351 | 3/1982 | European Pat. Off. . |
| 0 261 711 A2 | 3/1988 | European Pat. Off. . |
| 2 470 912 | 6/1981 | France . |
| 53-18025 A2 | 2/1978 | Japan . |
| 58-142084A | 8/1983 | Japan . |
| 904639 | 8/1962 | United Kingdom ................... 403/331 |
| 1019691 | 2/1966 | United Kingdom ..................... 285/23 |

*Primary Examiner*—Lynne H. Browne
*Assistant Examiner*—Greg Binda
*Attorney, Agent, or Firm*—Hoffman & Baron, LLP

[57] ABSTRACT

A connecting means for two parts in a fluid conducting assembly. The connecting means comprises coupling means located on joint sides opposite to one another on the parts, such means rendering possible a displaceable attachment together of the parts with an interlocking effect in the assembly direction. Furthermore connecting members are provided to act on opposite sides of the parts, of which at least one connecting member, is able to be locked using holding and securing means on the pushed together parts in order to set the relative position of same. Simultaneously the setting in place of a clamping means acting on the connecting members is facilitated. The connecting means renders possible a simple, secure and rapid coupling of the parts.

30 Claims, 4 Drawing Sheets

CONNECTING MEANS FOR TWO MEMBERS IN FLUID CONDUCTING ASSEMBLY

BACKGROUND OF THE INVENTION

The invention relates to a connecting means for two parts in a fluid conducting assembly and more especially in a modularly designed means for handling compressed air, comprising holding portions located on sides opposite to one another athwart the direction of mounting of the parts, said holding portions being associated with each other in pairs when said parts are put together, and furthermore connecting members adapted to be mounted on the pairs of associated holding portions in a connecting position, said connecting members being able to be clamped by a clamping means in a clamping direction, which is athwart the said direction of mounting, against the respectively associated pairs of holding portions in order to cause the parts to be clamped together at facing joint faces thereof.

THE PRIOR ART

A connecting means of this type is for example described in the European patent publication 0 261 711 A2.

Same is employed to releasably join together in pairs the housing bodies of a plurality of means, which are arranged in tandem, for handling compressed air. Means of this type are also termed servicing devices, which may be fitted together to form modular servicing units. The servicing devices or, respectively, servicing units are incorporated in a compressed air supply system and serve for processing, that is to say for handling compressed air, in which case they as a rule comprise a filter device, a pressure setting means and an oiler.

A respective holding portion is located on the respective parts to be connected together, in the joint face on opposite part sides. When the parts are placed together such holding portions assume positions in which they are adjacent to one another in pairs. In order to hold the parts together in the direction of fitting clamp-like connecting members are present, which may be put in place on the opposite part sides on the pairs of holding portions so as to straddle same. With the aid of a clamping means, which possesses clamping screws acting on the two connecting members for drawing them together, the holding portions are acted upon so that the housing bodies are clamped together at the joint.

A similar sort of connecting means is also illustrated in the Japanese patent publication 58-142 084 A.

A disadvantage of the known connecting means is that they are awkward to handle. It is firstly necessary to hold the members to be connected in the desired position of fitting, then put on the connecting members and lastly apply the clamping screws. All in all this is a relatively difficult task because so many components must be held simultaneously.

In order to tackle this problem there has already been a proposal in the U.S. pat. No. 5,383,689 to locate the parts to be joined, before putting them on and prior to operation of the clamping means, by means of intermediate plates, such plates being inserted between the adjacent parts and causing an interlocking fixing action for the parts in the direction of assembly. However, there is still the danger that, if there is a lack of care, the parts while only preliminarily fixed in place may slide off the intermediate plate before application of the clamping means and drop onto the ground with a danger of damage.

SHORT SUMMARY OF THE INVENTION

One object of the invention is to provide a connecting means of the type initially mentioned which may be handled more rapidly, simply the more securely.

In order to achieve these and/or other objects appearing from the present specification, claims and drawings, in the present invention coupling means are provided on the two parts on their facing joint faces, which means render possible, prior to the application of the connecting members, a coupling of the parts in such a manner that the parts may be slid in the direction of clamping in relation to one another and are simultaneously interlockingly fitted together in the direction of fitting and wherein on at least one of the connecting members and on the side facing the same of the parts holding and locking means are provided, which, when the connecting member is in the connecting position cooperate with one another in such a manner that the connecting member is held, even prior to actuation of the clamping means, on the parts and then simultaneously prevents a relative displacement of the two parts.

The coupling means provided on the members now render it possible for the members to be connected to be pre-fixed or "tacked" in place prior to clamping of the connecting members with the desired alignment. By then putting on at least one connecting member having holding and securing means, if still to hand, the relative mobility of the members in the clamping direction is terminated so that the parts are at least substantially positioned or located in the relative setting, which they also assume after actuating the clamping means. The holding means ensure that the respective connecting member will keep in the connecting position on the parts even when it is let go of. This means that, dependent on circumstances, one hand will always be free to hold the pre-fixed parts and the other hand may be employed to actuate the clamping means, the cooperating holding means then leading to the advantage of being able to hold the respective connecting member in place on putting on the clamping means. One person alone is therefore able readily in a position to put together two parts firmly, rapidly and without risk of damage. The connecting means is consequently suitable more especially for the releasable mutual locking together of the housing parts of different components of a system for handling compressed air. A further promising field of application is coupling together components of a valve arrangement, for example to group together valves or to attach same to base plates.

Further advantageous developments of the invention it are defined in the claims.

It would be feasible to have separate designs of securing means serving for preventing displacement of the parts and of holding means serving for holding connecting members applied to the parts. However it is considered more advantageous to use a design, in which the holding and securing means are made integrally and perform a double function.

It is an advantage if the connecting member provided with holding and securing means is designed in the form of a locking bolt member, whose holding and securing means interlock with the holding and securing means in the connecting position athwart the clamping direction. This results more particularly in an effect, due to interlocking, preventing relative sliding between the parts to be connected.

Manipulation is particularly simple, if the bolt member, as seen in the position of use of the parts, may be introduced downward into the connecting position and remains in same owing to gravity. The bolt may in this case be extremely simply put into the desired position.

The clamping means is conveniently so designed that in the active position it simultaneously engages both connecting members and draws same together so that they are clamped to the holding portions. It is in such a manner that it becomes unnecessary to clamp the connecting members in each case separately to the associated pair of holding parts.

As a rule the connecting means will possess two connecting members arranged on opposite part sides. In this respect it is an advantage if only one of such connecting members is provided with holding and securing means, such connecting member being more especially arranged on the rear side of the parts facing away from the person doing the assembly work. Owing to the lack of corresponding holding and securing means the other connecting member may be extremely simply put on the associated pair of holding portions without any particular locking motion so that there is the possibility of arranging fastening screws of the clamping means on such connecting member so that the screws cannot come out or be lost.

In the joint part between the parts to be connected a seal arrangement may be located, if the transition between flow ducts in communication with each other must be sealed off. In this case it is advantageous for at least one of the parts to be connected to be formed with a slanting face on at least one of the edge portions, of its joint face, facing in the direction of clamping, such slanting face facilitating the sliding past of the seal arrangement. The initial sliding coupling between the parts may also be simplified if the coupling means are adapted to one another in configuration so that when the interlocking connection is produced there is, prior to putting on the connecting members, a certain, small degree it of play is possible between the parts in the direction of putting on.

As coupling means it is convenient to provide rail elements aligned with the clamping direction and cooperating together in pairs, such rail elements being designed as separate component and being able to be fixed in place by detent connections on the respective part.

Further advantageous developments and convenient forms of the invention will be understood from the following detailed descriptive disclosure in conjunction with the accompanying drawings.

LIST OF THE SEVERAL VIEWS OF THE FIGURES

DETAILED ACCOUNT OF WORKING EMBODIMENTS OF THE INVENTION

Figure 1:
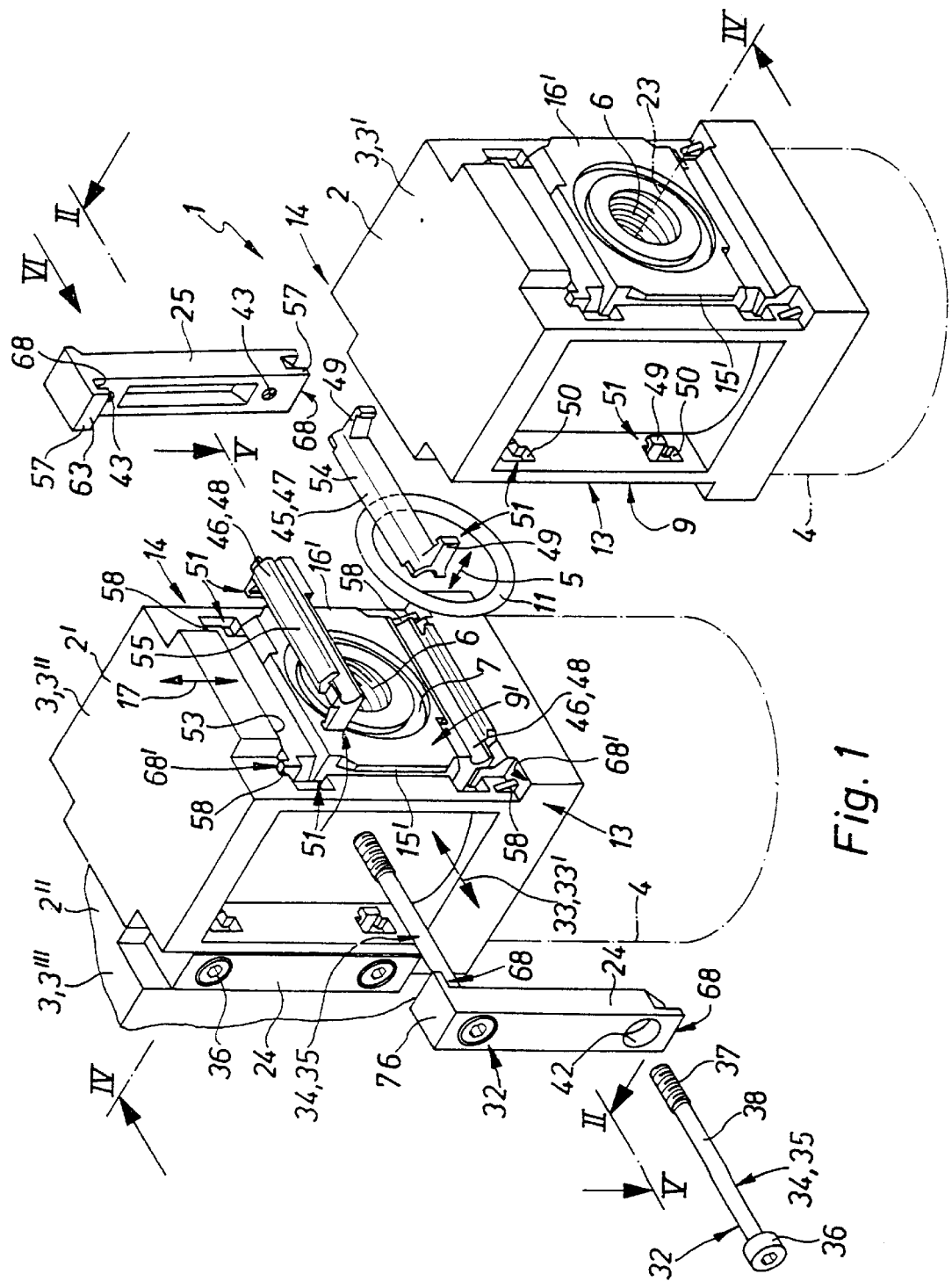
FIG. 1 shows a fluid conducting assembly comprising a plurality of parts joined together respectively in a releasable manner by means of a connecting means in accordance with the invention, two of the parts and the connecting means associated with same being illustrated in the separated state prior to putting together.

FIG. 1 diagrammatically shows a means 1 placed somewhere along a compressed air line, not illustrated in detail, for handling or treating the compressed air. The means could also be termed a servicing means or a conditioning means for compressed air. It is a question of a modularly designed component assembly through which in operation fluid flows, and which for instance comprises three working units 2, 2' and 2" only illustrated diagrammatically, in the case of which it is a question of a filter unit 2, a pressure setting unit 2' and an oiler unit 2".

The individual working units 2, 2'and 2" respectively possess a cubic or block-like main or housing part 3, which is in the following will be simply termed a "part". On the respective part 3, as for example on its bottom side, a functional unit 4 can be arranged, which for the sake of simplicity is only diagrammatically shown.

Each part 3 has an internal fluid duct 6, which opens at opposite terminal faces of the respective part 3. Any desired number of the parts 3 may be put on or applied in pairs so that several of them are placed in sequence in an assembly direction 5. Parts 3 which are put together have their facing terminal faces in firm engagement with each other, for which reason such terminal faces are in what follows referred to as joint faces 9 and 9'.

In the assembled state of the parts 3 the individual flow ducts 6 may constitute a common through flow duct. In the joint portion 10 defined by mutually facing joint faces 9 and 9' an annular seal or gasket 11 preferably is placed, which serves to seal off the transition between the aligned flow ducts 6. The seal 11 surrounds the opening portions of the flow ducts 5, preferably in a concentric arrangement and it is lodged in a correspondingly formed holding groove 7, which is provided in one of the joint faces 9'. Prior to the putting together of the parts 3 the seal 11 will project slightly in the assembly direction 5 out from the holding groove 7 and past the associated joint face 9' so that when the parts 3 are joined together it will be thrust by the joint face 9 of the other part for the product-ion of the necessary sealing contact force.

Figure 4:
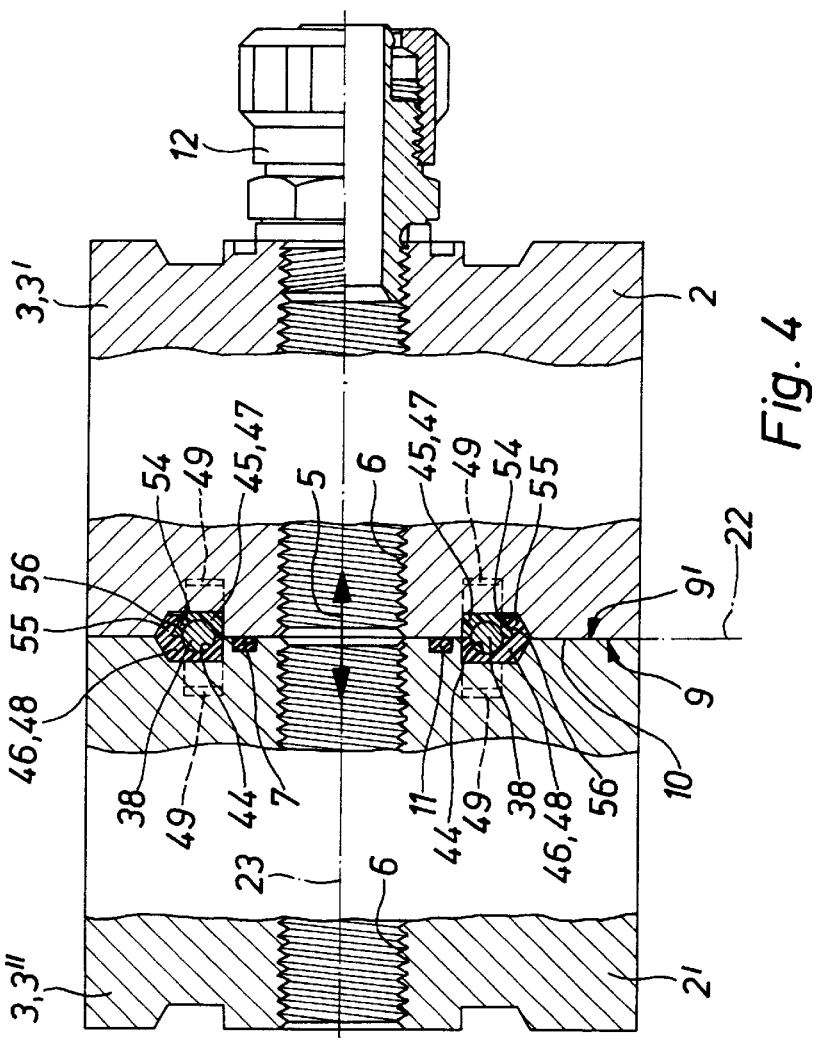
FIG. 4 is a longitudinal section taken through two parts joined together looking in the clamping direction in accordance with the section line IV—IV of FIG. 1.

The opening portions of the flow ducts 6 may be provided with connection screw threads rendering it possible to secure a union piece 12, illustrated by way of example in FIG. 4, thereon, such piece serving for the attachment of a pressure medium line leading on to other equipment.

The parts 3 of the various different working units 2, 2' and 2" preferably possess the same width. This means that the faces of the part sides 13 and 14, which in the assembled state of the parts are located on opposite longitudinal sides, merge with each other in alignment. For reasons of technicalities of manufacture the parts 3 have a recess on the above mentioned lateral sides, which in the embodiment represent a front (13) and a rear (14) part side, such recess being normally shut off by a cover, not illustrated in detail.

The individual parts 3 can be put together in pairs with their joint faces 9 and 9' in contact and be clamped releasably together while set on one another. FIG. 1 shows two parts 3' and 3" while still in the separate state, the one part 3" already having been put on a further part 3'".

At its two sides 13 and 14 opposite to one another in a direction athwart the assembly direction and at its two joint faces 9 and 9' each part 3 possesses at least one holding portion 15, 15': 16 and 16'. Preferably just one such a holding portion 15, 16; 16 and 16' is provided for each joint face 9 and 9' on either side 13 and 14 of the part, such holding portion preferably being positioned half way up the height of the respective part 3. Once the parts have had their joint face 9 and 9' put together, there will be a paired association of holding portions 15, 15'; 16 and 16' of the two adjacent parts 3. In the example, the holding portions 15, 15'; 16 and 16' are put together in pairs.

It is preferred for the holding portions 15, 15'; 16 and 16' to be formed, as illustrated, by projections which are more particularly integrally produced on the parts 3, such projections having a longitudinal extent coinciding with the height direction, as indicated by the double arrow 17, and furthermore extending athwart the assembly direction 5 away from the respective part 3. It may be a question of rib-like holding portions.

On its side opposite to the associated joint face 9 and 9' in the assembly direction 5, each holding portion 15, 15'; 16 and 16' is provided with a first actuating face 18. This face extends at a slant to the joint plane 22 defined by the joint portion 10 and running at a right angle to the assembly direction 5 (FIG. 5) in such a manner that as the distance from the longitudinal axis 23, extending in the assembly direction 5, of the part 3 increases, the first actuating face 18 approaches the joint plane 22. The first actuating faces 18 of the respective pair of holding portions 15, 15'; 16 and 16' consequently extend outward obliquely toward each other, such pair of holding portions practically constituting a hump, which tapers in an outward direction.

When the parts 3 are fitted together it is possible for a connecting member 24 and 25 to be placed on each resulting pair of holding portions 15, 15'; 16 and 16'. The position assumed in the assembled or put on state, which will be seen for example from the right hand half of FIG. 2 and from FIG. 5, will be here termed the connecting position.

Each connecting member possesses mutually spaced counter-holding portions 29, which in the connecting position of the associated pair of holding portions 15, 15'; 16 and 16' fit over in the first actuating faces 18. It is preferably a question in the case of the connecting members 24 and 25 of rod- or rail-like longitudinal elements, which on one longitudinal side have a pocket-like recess 30 so that lateral edges remain, which constitute the counter-holding portions 29. The side faces provided on such counter-holding portions 29 and delimiting the pocket-like recess 30, constitute second actuating faces 19, which possess a complementary oblique form adapted to the oblique form of the first actuating faces 18. This configuration is produced by having a pocket-like shape, tapering in cross section toward the floor, of the pocket-like recesses 30. If a connecting member 24 and 25 assumes the connecting position, it will be have its second actuating faces 19, spaced in the direction of assembly 5, in engagement with the associated first actuating faces 18, something which is made clear in FIG. 5.

In order to provide for the smoothest possible transition between the part sides 13 and 14 even when the connecting members 24 and 25 have been put on, the parts 3 are so designed on such sides 13 and 14 thereof that in the assembled state surface recesses 31 are present which have the joint plane 22 extending through them, the associated connecting member being received, more particularly entirely in such recesses. In the holding portions 15, 15'; 16 and 16' the parts 3 are provided with recesses, which in the assembled state continue and form part of the said surface recesses 31.

The connecting members 24 and 25 having assumed the connecting position are able to be clamped with the aid of a clamping means 32 in a clamping direction 33 as indicated by the double arrow athwart and more especially at a right angle to the assembly direction 5 onto the respectively associated pair of holding portions 15, 15'; 16 and 16'. The clamping direction 33 coincides with the height direction of the pairs of holding portions 15, 15'; 16 and 16' which lead to there being a hump-like structure. In the present example the clamping force is exerted because as a clamping means 32 two tie-like clamping elements 34 are provided, which when in action extend in the joint portion 10 through the arrangement of the parts 3 and simultaneously are anchored on both connecting members 24 and 25, which are drawn toward one another by the clamping elements 34. Owing to their being drawn together the connecting members 24 and 25 act at their second actuating faces 19 on the first actuating face 18, which are also oblique, of the pairs of holding portions 15, 15'; 16 and 16' so that there will be a force component directed in the assembly direction, such force component thrusting together the mutually associated holding portions 15, 15'; 16 and 16' and hence the two parts 3 at their joint faces 9 and 9'. Since in the joint portion 10 there is no intermediately placed intermediate member, there will be a direct and accordingly particularly secure clamping action while at the same time providing for extremely compact dimensions of the completed assembly in the assembly direction 5.

In order to render possible actuation of the clamping elements 34 from the front side 13 of the parts, in the example the clamping elements are designed in the form of clamping screws 35, which possess a screw head 36 and a screw shank 38 having a screw thread 37, the length of the shank being approximately equal to the width of the parts 3. The connecting member 24 associated with the front side 13 of a part 3 has through openings 41 spaced out along the length direction of the connecting member 24, such openings 41 being provided with a widened out portion 42, on the outer side facing away from the part 3, to receive the respective screw head 36. A constriction in the opening 41 is provided with an internal screw thread so that the clamping screws 35 may, as indicated in the bottom half of FIG. 2, have their relatively short end screw thread screwed through until the somewhat thinner shank 38 runs through the opening 41. It is in this manner that the clamping screws 35 are prevented from being lost by being held on the front connecting member 24.

The rear connecting member 25 possesses aligned screw threaded holes 43, which render possible the screwing in of the thread 37 of the clamping screws 35.

Furthermore steps are taken in connection with the parts 3 to ensure that, when the parts 3 have their joint portions 10 put together, two channel-like passage openings 44 are available in the join area, which are open toward either side 13 and 14 of the parts, and are aligned with the openings 41 and, respectively, the threaded holes 43 in the connecting members 24 and 25 located in the connecting position. The openings 44 render it possible for the clamping screws 35 to act through them. It is convenient if, in terms of the longitudinal axis 23 or, respectively, the flow duct 6, they are diametrally opposite to each other, same being placed in the preferred position of use above and below the flow duct 6 and being aligned in the clamping direction 33.

On each of the parts 3 to be connected coupling means 45 and 46 are provided in their joint faces 9 and 9' and accordingly conveniently within the joint portion 10, such coupling elements so rendering possible a coupling of the parts 3 (prior to putting on the connecting member 24 and 25) that the parts 3 may be relatively displaced in a direction of sliding 33' coinciding with the clamping direction 33 and at the same time are interlockingly fixed together in the direction 5 of assembly. Therefore prior to clamping as such a pre-fixing step is possible in order to facilitate further handling. In order to bring the parts 3 in the pre-fixed position, the parts 3 are firstly brought into a position offset at a right angle from the assembly direction 5, there being simultaneously an alignment as regards the coupling means 45 and 46 in order to push the two parts 3 as part of sliding movement coinciding with the clamping direction 33 onto one another until they assume the desired position with flow ducts 6 aligned with one another. In this respect detent means (not illustrated) may be provided, which facilitate attaining an exactly central position.

In the embodiment of the invention illustrated two complementary coupling means 45 and 16 are present on facing joint faces 9 and 9' of the parts 3 to be joined, such coupling means being arranged a distance apart and being formed by rail elements 47 and 48 aligned in the clamping direction 33. Such rail elements are conveniently components separate from the respective associated part 3, on which they are releaseably fixed. In the example the rail elements 47 and 48 are set in place by detent connecting means 51 on the joint face 9 and 9'. For this purpose detent lugs 49 are molded on the rail elements 47 and 48 terminally, such lugs projecting in the transverse direction and being able to be moved laterally and elastically in the said direction, such detent lugs bearing a detent projection, fitting into a detent opening 50 in the joint face 9 and 9' fitting around a detent portion of the detent opening 50 with such detent projections. This arrangement may naturally also be reversed as well. In order to have an exact alignment of the rail elements 47 and 48, same are fitted into holding grooves 53, which extend in the clamping direction 33, and which are machined in the joint faces 9 and 9'. The rail elements 47 and 48 are conveniently designed in the form of integral components consisting of synthetic resin.

As more especially shown in FIG. 4, coupling portions 54 and 55 are located of the mutually associated rail elements 47 and 48, such coupling portions interlocking in the assembly direction 5 in the coupled state. The interlocking action is so selected that a relative shifting motion in the longitudinal direction is possible. The mutually associated coupling portions 54 and 55 are for this purpose provided with mutually cooperating sliding faces 56. The arrangement may more particularly be such that the coupling portions 54 and 55 of the two pairs of rail elements 47 and 48 interlock like dove-tail joint and run on each other in a sliding manner.

The design of the cooperating coupling portions 54 and 55 is preferably such that the parts 3 pre-fixed in an interlocking fashion by same are set on each other with some play in the assembly direction prior to the application and actuation of the clamping means 32. This ensures that the parts 3 can be slid on one another in free running manner that furthermore the seal 11 projecting a small distance past the one joint face 9' is not shorn off. In the slid on state the slight biasing action of the seal 11 will serve to provide a non-positive fixation in place in the displacement direction 33' coinciding with the clamping direction 33.

Figure 5:
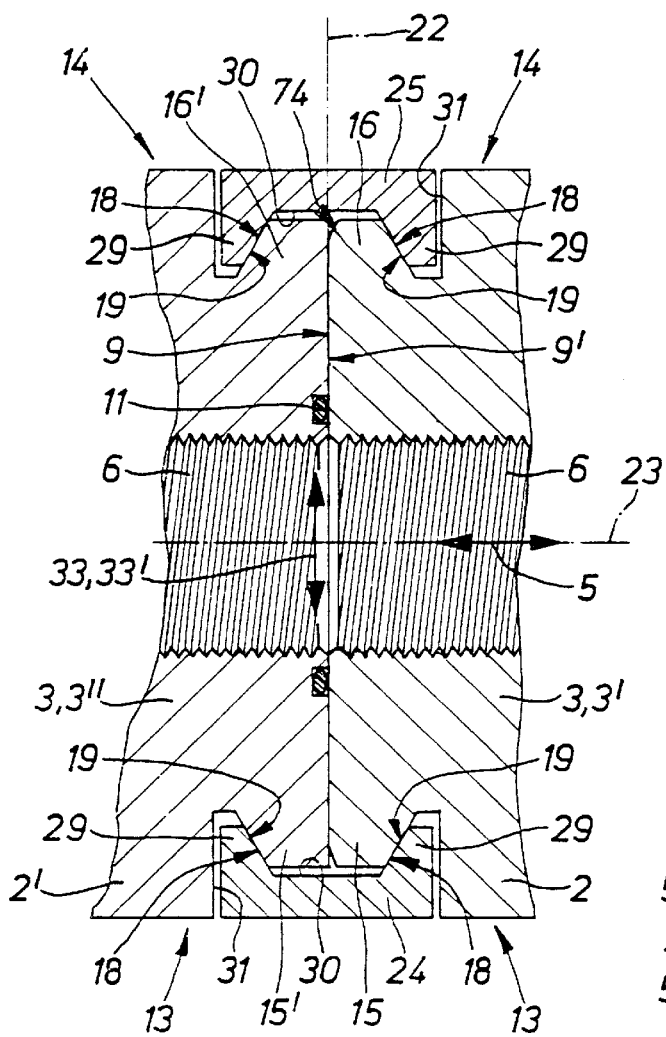
FIG. 5 is a cross section taken through two parts joined together in the joint portion looking at a right angle to the clamping direction, in accordance with the line of section V—V in FIG. 1.
Figure 6:
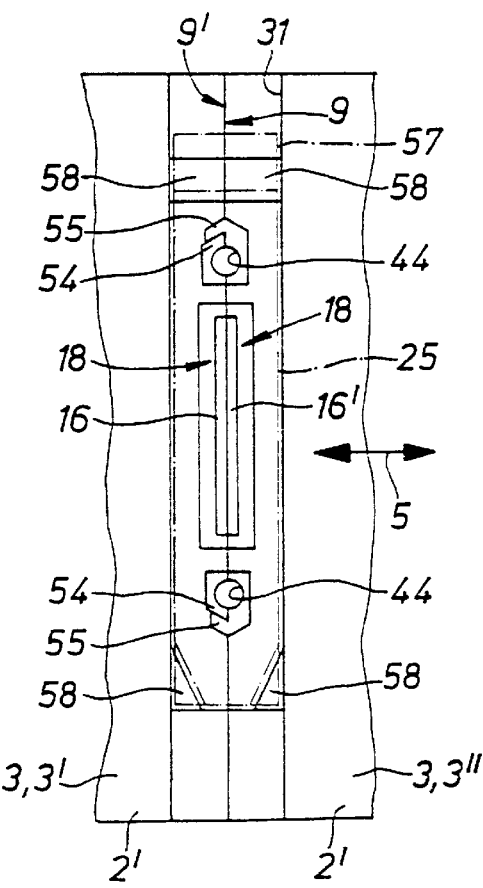
FIG. 6 is a side view in the joint portion of two assembled parts pre-fixed in position by coupling means, the associated connecting member being indicated in chained lines, looking in the direction of the arrow VI in FIGS. 1 and 2.

In order to prevent damage to the seal 11, it is possible in addition or as an alternative for the part 3 opposite to the seal 11 to be made oblique on at least one of its edge portions, facing in the displacement direction 33', of the joint face 9. Such oblique faces are indicated in FIG. 5 at 74.

In the present embodiment there is furthermore a provision such that the rail elements 47 and 48 are so designed that in the coupled state they respectively define a through opening, which represents one of the above mentioned openings 44, through which the associated clamping screw 35 may be introduced. Then even the molding of the corresponding openings 44 in the parts 3 ceases to be necessary. Each rail element 47 and 48 may possess a groove-like recess, which together with the groove-like recess in the respectively associated rail element defines a passage opening 44.

For further simplification of fitting of the assembly there is a provision such that the connecting member 25 associated with the rearwardly orientated part sides 14 possesses first holding and securing means 57, which in the connecting position cooperate with second holding and securing means 58 provided on the associated side 14 of the parts 3. This cooperation is characterized in that the respective connecting member 25 may be fixed in place even prior to actuation of the clamping means 32 and in this respect it simultaneously causes an effect for preventing displacement between the parts pre-fixed using the coupling means 45 and 46. This means on the one hand that the pre-fixed parts 3 maintain their alignment even if in the course of assembly they are moved into a slanting position, wherein the clamping means 32 and accordingly the similarly aligned direction 33' of displacement is at a slope in relation to the horizontal. Furthermore the connecting member 25 is so located that it is not pushed out of place on engagement of the thread 37 of the clamping screws 35 so that the clamping screws 35 may be threadedly engaged and screwed in without the connecting member 25 with the internal screw thread 43 having to be held in one hand additionally.

In accordance with a preferred design the holding and securing means 57 and 58 both of the connecting member 25 and also of the parts 3 are designed as a single structural and consequently functional unit. The holding function and the securing function is in this manner performed by one and the same component.

The second holding and securing means 58 provided on the parts 3 are in the illustrated embodiment designed as projections 62, for instance like ribs, such projections extending athwart and more particularly at a right angle to the clamping direction 33 or, respectively, the displacement direction 33' coinciding with it. On its respective side 14 in the two joint faces 9 and 9' each part 3 has preferably two second holding and securing means 58, which are spaced a distance apart in the height i direction 17 and are arranged on the respective part 3. The arrangement is furthermore such that respectively two second holding and securing means 58, placed at the same level, are opposite to one another in pairs when the parts 3 are applied, as is made clear by FIG. 5. On the connecting member 25 having a longitudinal extent there is an arrangement of complementary first holding and securing means 57 which are spaced out in the longitudinal direction. In the connecting position they interlock the second holding and securing means 58 provided on the parts in a direction athwart the clamping direction 33 or, respectively, sliding direction 33'. The connecting member 25 is hence designed in the form of a locking bolt, which in the connecting position locks or locates the pre-set position of the parts 3.

As regards details in the embodiment of the invention the top first holding and securing means 57 of the connecting member 25 is designed in the form of as a hook portion 63 extending toward the part and downward, such hook part 63 interlocking simultaneously with the associated second holding and securing means 58 in the connecting position. The latter then fit into a groove-like recess 64 in the connecting member 25 so that there is a preferably positive locking and fixing action preferably allowing for play.

On the bottom side of the connecting member 25 two first holding and securing means 57 designed as spurs 65 are provided, which in the connecting position interlock with one respective one of the second holding and securing means 58 constituted by the projections 62. The projections 62 then fit into recesses 66 in the connecting member 25, which are delimited by the spurs 65. The cooperation of the bottom first and second holding and securing means 57 and 58 in the displacement direction 33 can also have a small degree of play, more particularly to facilitate the putting on of the connecting member 25.

Figure 2:
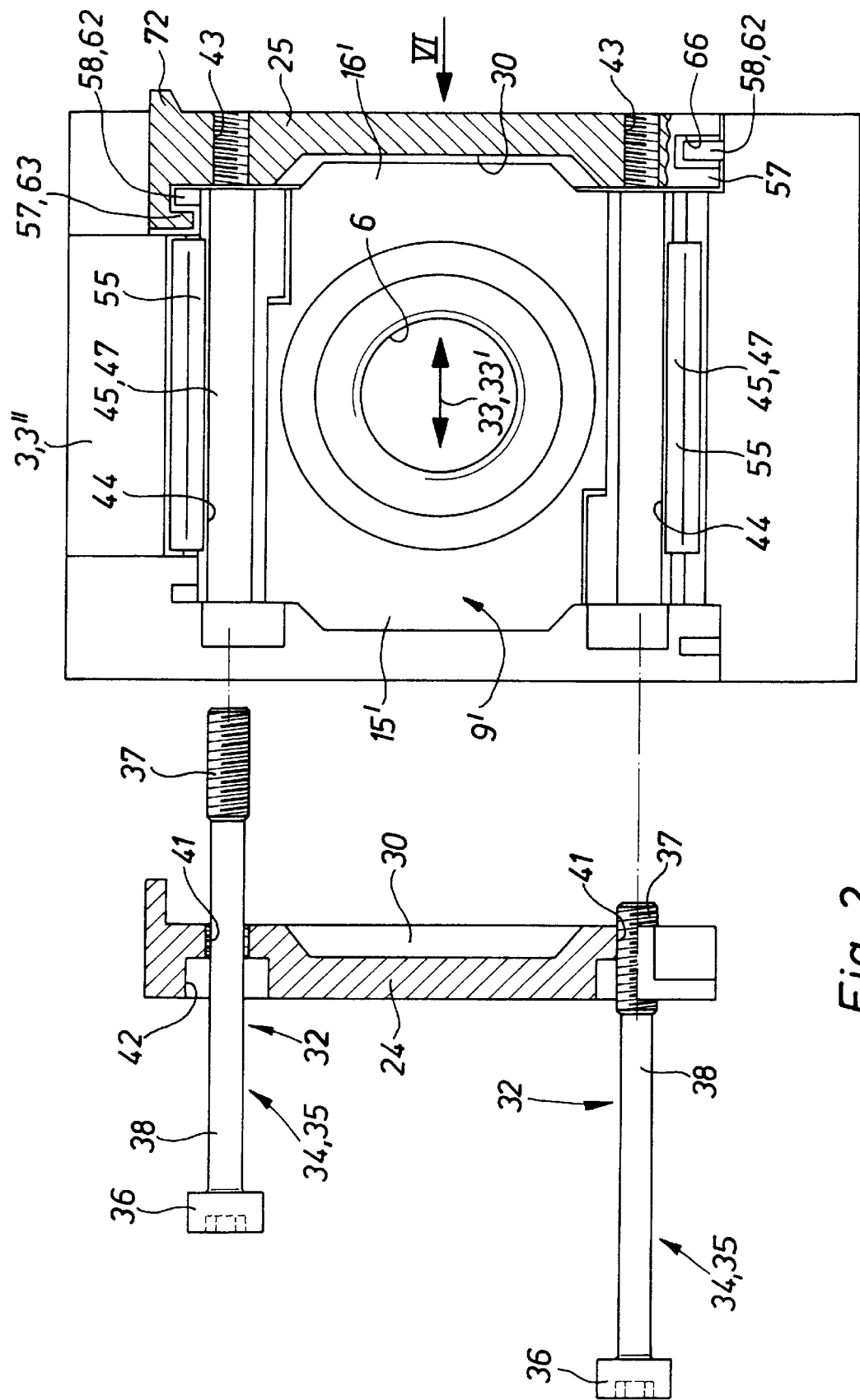
FIG. 2 shows a cross section taken through the arrangement of FIG. 1 on the line II—II in the joint, it however only being the connecting members which are illustrated in section, and a connecting member provided with holding and securing means being depicted after assuming the connecting position.

As is readily apparent from FIG. 2, the top first and second holding and securing means 57 and 58 are located above the holding portions and counter-holding portions, whereas the bottom first and second holding and securing means 57 and 58 are arranged underneath the holding portions and the counter-holding portions. It is preferred for both top and bottom holding and securing means to be arranged at the threaded holes 43 so that there is an optimum supporting effect, when the clamping screws 35 take effect.

Figure 3:
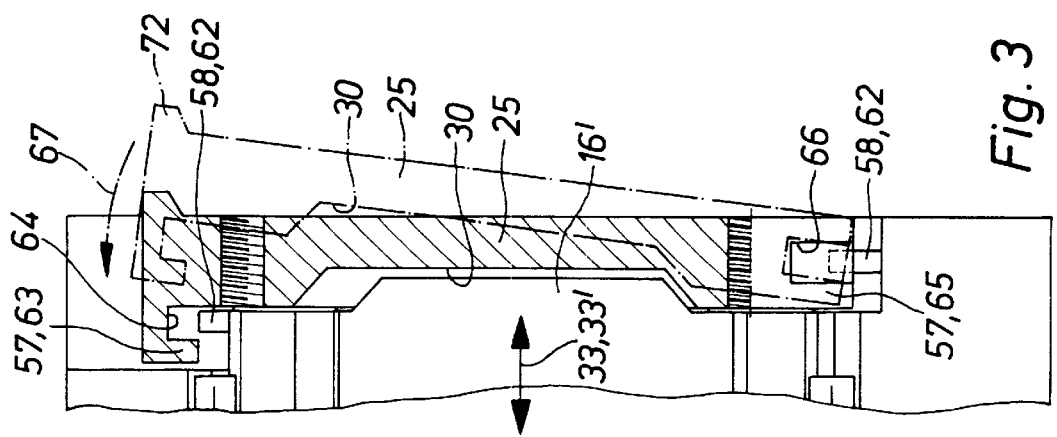
FIG. 3 shows the portion illustrated on the right in FIG. 2 with the connecting member in the home position before shifting into the connecting position, a possible starting possible being illustrated in chained lines, starting from which position the connecting member can be pivoted in the home position as indicated by the arrow.

It will be seen from FIG. 3 how the connecting member 25 may be put in the connecting position in the simplest possible way. The connecting member 25 is moved It in an oblique setting so that its bottom first holding and securing means 57 engage the bottom second holding and securing means 58 of the parts 3. In this respect the connecting member 25 is firstly slightly raised. It is then pivoted as part of the swinging movement indicated by the arrow 67 into a home position, which is indicated in FIG. 3 in full lines. In this case the connecting member will already have assumed the alignment present in the connecting position in relation to the part 3, without however the top first and second holding and securing 57 and 58 coming into interlocking engagement yet. In the next step the connecting member 25 is shifted or displaced out of the still somewhat lifted home position downward into the connecting position. It would consequently also be possible to term the connecting member 25 a sliding bolt member. Owing to the play present no particular exertion of force is required for causing the sliding motion and in fact it is sufficient to release the connecting member 25 so that it will move into the connecting position under gravity and be held therein.

It will be clear that the inward pivoting movement 67 is furthermore unnecessary if the matching of the first and second holding and securing member is made such taking into account the dimensions of the holding portions 15, 15'; 16 and 16' and of the counter-holding portions 29 that the connecting member 25 may be moved into the hole in parallelism in the displacement direction 33' and may then be lowered.

In order to be able to couple the parts 3 in any desired alignment comparable second holding and securing means 58 are also present at the front sides 13 of the parts 3. However in the embodiment of the invention they do not act, since the associated front connecting member 25 lacks any first holding and securing means 57. This latter feature means that the connecting member 24 may be moved into the connecting position simply as part of a putting on movement parallel to the displacement direction 33' so that the clamping screws 35, mounted so that they cannot drop off or be lost, do not hinder the putting on operation. It is more particularly when the clamping screws 35 are not mounted in advance that the front connecting member 24 could be provided with the above described first holding and securing means 57.

In order to be able to exactly position the front connecting member 24 in the connecting setting, it does however best have guide faces 68 which preferably are at a right angle to the direction 33' of displacement and in the example face downward in the height direction 17, at which faces the connecting member 24 is engaged on oppositely directed counter-positioning faces 68' facing in the opposite direction in the put on position. This means that its relative level in relation to the part 3 is preset. In the example at the top side and at the bottom side of the connecting member 24 positioning or locating faces 68 are present, the bottom locating face 68 being provided at the end face of the connecting member 24 and the top positioning face 68 being provided on the bottom side of a projection 76 extending away toward the other connecting member 25.

The rear connecting member 25 also has positioning faces 68 of the above mentioned type, the top locating faces 68 being provided on the projecting hook portion 63.

The connecting member 25 provided with holding and securing means 57 preferably possesses in addition a handle portion 72, which more particularly makes it easier to raise the connecting member 25 if it is to be taken out of the connecting position. The handle portion 72 may for example be constituted by a projection formed on the rear side.

Both connecting members 24 and 25 are consequently designed in the form of hook-in elements, at least one (25) of such connecting members being able to be so hooked in place that it is not only held in the height direction 17 but also simultaneously in the displacement direction 33' on the parts 3.

We claim:

1. A connection device for connecting two parts in a fluid conducting assembly, comprising holding portions located on sides opposite to one another athwart the direction of connection of the two parts, said holding portions being associated with each other in pairs when said parts are connected together, and a first and a second connecting member adapted to be mounted on the pairs of associated holding portions in a connecting position, said connecting members being able to be clamped by a clamping means in a clamping direction, which is athwart the said direction of connection, against the respectively associated pairs of holding portions in order to cause the parts to be clamped together at facing joint faces thereof, wherein coupling means are provided on the two parts on their facing joint faces, which, prior to the application of the connecting members, provide a coupling of the parts in such a manner that the parts may be slid in the direction of clamping in relation to one another and simultaneously interlockingly fitted together in the direction of connection such that the parts are prevented from separating in the direction of connection, and wherein a first holding and securing means is provided on at least the first connecting member and a second holding and securing means is provided on at least the side of the part facing the first holding and securing means, the first and second holding and securing means cooperating with one another in such a manner that the first connecting member is held, even prior to actuation of the clamping means, on the parts and simultaneously prevents a relative displacement between the two parts.

2. The connection device as set forth in claim 1, wherein said coupling means are detachably removable from the connection device.

3. The connection device as set forth in claim 1, wherein the first connecting member comprises a locking bolt member having the first holding and securing means adapted to interlock with the cooperating second holding and securing means provided on said part in the connecting position athwart the clamping direction.

4. The connection device as set forth in claim 3, wherein the locking bolt member comprises a sliding locking bolt member adapted to be set in a home position on the parts to be connected and to be shifted by a subsequent shifting motion into the connecting position.

5. The connection device as set forth in claim 4, wherein the said shifting motion extends in a direction parallel to the joint plane and to the sides of the parts to be connected.

6. The connection device as set forth in claim 4, wherein the first connecting member is so designed that it is able to be positioned in the home position as part of an inward pivoting movement.

7. The connection device as set forth in claim 3, wherein the first connecting members as seen in a position of use of said parts, may be introduced downward into the connecting position and dwell in same owing to gravity.

8. The connection device as set forth in claim 1, wherein the first holding and securing means comprise at least one hook portion, which in the connecting position interlocks with at least one projection forming part of the second holding and securing means on the said part facing the first holding and securing means.

9. The connection device as set forth in claim 1, wherein said first connecting member is designed in the form of a longitudinal element and possesses a pair of first holding and securing means spaced out in the longitudinal direction.

10. The connection device as set forth in claim 1, wherein the holding portions are formed by projections provided on the parts, such projections being overlapped in the connecting position of the connecting members by counter-holding portions provided on the connecting members.

11. The connection device as set forth in claim 10, wherein the counter-holding portions are formed by lateral limits of pocket-like recesses in the connecting members.

12. The connection device as set forth in claim 10, wherein the holding portions and/or the counter-holding portions possess actuation surfaces extending obliquely to the direction of clamping.

13. The connection device as set forth in claim 1, wherein the clamping means comprises at least one clamping element which in an acting state thereof extend between the two parts and engage the two connecting members.

14. The connection device as set forth in claim 13, wherein the clamping element is designed in the form of a clamping screw and possesses a screw thread adapted to be screwed, in an acting state, into a screw threaded hole in the first connecting member.

15. The connection device as set forth in claim 13, wherein the clamping element is designed in the form of a clamping screw having a head bearing against the second connecting member in the acting state, the screw being permanently attached to the second connecting member.

16. The connection device as set forth in claim 1, wherein, in the connecting position, the connecting members are received in recesses formed jointly by the two parts.

17. The connection device as set forth in claim 1, wherein at least one of the parts is made oblique on at least one edge portion facing in the clamping direction.

18. The connection device as set forth in claim 1, wherein the coupling means are so matched to each other that the parts coupled by same in an interlocking manner are locked together with play in the direction of connection.

19. The connection device as set forth in claim 1, wherein the coupling means provided on the two parts possess coupling portions extending in the clamping direction and interlocking in a coupled state, in the direction of connection.

20. The connection device as set forth in claim 19, wherein the coupling portions are provided on rail elements adapted to cooperate in pairs and aligned in the clamping direction.

21. The connection device as set forth in claim 20, wherein the rail elements are designed in the form of separate and interchangeable components.

22. The connection device as set forth in claim 20, wherein the rail elements are secured in position to the parts by a detent connecting means.

23. The connection device as set forth in claim 20, wherein the rail elements are so designed that in the coupled state the rail elements provide a passage opening, extending in the clamping direction, for a clamping element adapted to simultaneously engage both connecting members.

24. A connection device for connecting two parts in a fluid conducting assembly, comprising holding portions located on sides opposite to one another athwart the direction of connection of the two parts, said holding portions being associated with each other in pairs when said parts are connected together, and a first and a second connecting member adapted to be mounted on the pairs of associated holding portions in a connecting position, said connecting members being able to be clamped by a clamping means in a clamping direction, which is athwart the said direction of connection, against the respectively associated pairs of holding portions in order to cause the parts to be clamped together at facing joint faces thereof, wherein coupling means are provided on the two parts on their facing joint faces, which prior to the application of the connecting members, provide a coupling of the parts in such a manner that the parts may be slid in the direction of clamping in relation to one another and simultaneously interlockingly fitted together in the direction of connection and wherein a first holding and securing means is provided on at least the first connecting member and a second holding and securing means is provided on at least the side of the part facing the first holding and securing means, said first holding and securing means comprising at least one hook portion and said second holding and securing means comprising at least one projection, said hook portion and said projection interlockingly cooperating with one another in such a manner that the first connecting member is held, even prior to actuation of the clamping means, on the parts and simultaneously prevents a relative displacement between the two parts.

25. A connection device for connecting two parts in a fluid conducting assembly, comprising holding portions located on sides opposite to one another athwart the direction of connection of the two parts, said holding portions being associated with each other in pairs when said parts are connected together, and a first and a second connecting member adapted to be mounted on the pairs of associated holding portions in a connecting position, said connecting members being able to be clamped by at least one clamping screw in a clamping direction, which is athwart the said direction of connection, against the respectively associated pairs of holding portions in order to cause the parts to be clamped together at facing joint faces thereof, said clamping screw being permanently attached to the second connecting member and having a head bearing against the second connecting member in an acting state, wherein coupling means are provided on the two parts on their facing joint faces, which prior to the application of the connecting members, provide a coupling of the parts in such a manner that the parts may be slid in the direction of clamping in relation to one another and simultaneously interlockingly fitted together in the direction of connection such that the parts are prevented from separating in the direction of connection, and wherein a first holding and securing means is provided on at least the first connecting member and a second holding and securing means is provided on at least the side of the part facing the first holding and securing means, the first and second holding and securing means cooperating with one another in such a manner that the first connecting member is held, even prior to actuation of the clamping screw, on the parts and simultaneously prevents a relative displacement between the two parts.

26. A connection device for connecting two parts in a fluid conducting assembly, comprising holding portions located on sides opposite to one another athwart the direction of connection of the two parts, said holding portions being associated with each other in pairs when said parts are connected together, and a first and a second connecting member adapted to be mounted on the pairs of associated holding portions in a connecting position, said connecting members being received in recesses formed jointly by the two parts and being able to be clamped by a clamping means in a clamping direction, which is athwart the said direction of connection, against the respectively associated pairs of holding portions in order to cause the parts to be clamped together at facing joint faces thereof, wherein coupling means are provided on the two parts on their facing joint faces, which prior to the application of the connecting members, provide a coupling of the parts in such a manner that the parts may be slid in the direction of clamping in relation to one another and simultaneously interlockingly fitted together in the direction of connection and wherein a first holding and securing means is provided on at least the first connecting member and a second holding and securing means is provided on at least the side of the part facing the first holding and securing means, the first and second holding and securing means cooperating with one another in such a manner that the first connecting member is held, even prior to actuation of the clamping means, on the parts and simultaneously prevents a relative displacement between the two parts.

27. A connection device for connecting two parts in a fluid conducting assembly, comprising holding portions located on sides opposite to one another athwart the direction of connection of the two parts, said holding portions being associated with each other in pairs when said parts are connected together, and a first and a second connecting member adapted to be mounted on the pairs of associated holding portions in a connecting position, said connecting members being able to be clamped by a clamping means in a clamping direction, which is athwart the said direction of connection, against the respectively associated pairs of holding portions in order to cause the parts to be clamped together at facing joint faces thereof, wherein rail elements extending in the clamping direction are provided on the two parts on their facing joint faces, said rail elements adapted to interlock in pairs thereby providing a coupling of the parts in such a manner that the parts may be slid in the direction of clamping in relation to one another and simultaneously interlockingly fitted together in the direction of connection prior to the application of the connecting members, and wherein a first holding and securing means is provided on at least the first connecting member and a second holding and securing means is provided on at least the side of the part facing the first holding and securing means, the first and second holding and securing means cooperating with one another in such a manner that the first connecting member is held, even prior to actuation of the clamping means, on the parts and simultaneously prevents a relative displacement between the two parts.

28. The connection device as set forth in claim 27, wherein the rail elements are designed in the form of separate and interchangeable components.

29. The connection device as set forth in claim 27, wherein the rail elements are secured in position to the parts by a detent connecting means.

30. The connection device as forth in claim 27, wherein the rail elements are so designed that in the coupled state the rail elements provide a passage opening, extending in the clamping direction, for a clamping element adapted to simultaneously engage both connecting members.

\* \* \* \* \*

UNITED STATES PATENT AND TRADEMARK OFFICE
CERTIFICATE OF CORRECTION

PATENT NO. : 6,039,358
DATED : March 21, 2000
INVENTOR(S) : Stoll, et al.

It is certified that error appears in the above-identified patent and that said Letters Patent are hereby corrected as shown below:

| | |
|---|---|
| In Column 2, Line 43, | the patent now reads "Further advantageous developments of the invention it are"; this should read --Further advantageous developments of the invention are--. |
| In Column 4, Line 44, | the patent now reads "for the product-ion of"; this should read --for the production of--. |
| In Column 7, Line 17, | the patent now reads "complementary coupling means 45 and 16 are"; this should read --complementary coupling means 45 and 46 are--. |
| In Column 8, Line 46, | the patent now reads "distance apart in the height i direction"; this should read --distance apart in the height direction--. |

Signed and Sealed this

Twenty-fourth Day of April, 2001

Attest:

NICHOLAS P. GODICI

Attesting Officer

Acting Director of the United States Patent and Trademark Office